(12) United States Patent
Chalaud

(10) Patent No.: US 9,021,869 B2
(45) Date of Patent: May 5, 2015

(54) METHOD FOR MANAGING THE OPERATION OF A FUEL METERING UNIT

(71) Applicant: SNECMA, Paris (FR)

(72) Inventor: Sebastien Chalaud, Vincennes (FR)

(73) Assignee: SNECMA, Paris (FR)

( * ) Notice: Subject to any disclaimer, the term of this patent is extended or adjusted under 35 U.S.C. 154(b) by 147 days.

(21) Appl. No.: 13/855,222

(22) Filed: Apr. 2, 2013

(65) Prior Publication Data

US 2013/0276522 A1    Oct. 24, 2013

(30) Foreign Application Priority Data

Apr. 19, 2012 (FR) ...................... 12 53615

(51) Int. Cl.
| | | |
|---|---|---|
| *G01M 15/14* | (2006.01) | |
| *F02M 65/00* | (2006.01) | |
| *F02C 7/22* | (2006.01) | |
| *F02C 7/236* | (2006.01) | |
| *F02C 9/26* | (2006.01) | |

(52) U.S. Cl.
CPC .............. *F02M 65/00* (2013.01); *F02C 7/22* (2013.01); *F02C 7/236* (2013.01); *F02C 9/263* (2013.01)

(58) Field of Classification Search
CPC ........... F02C 7/22; F02C 7/236; F02M 65/00; G01M 15/14
USPC .......................................... 73/112.01, 112.03
See application file for complete search history.

(56) References Cited

U.S. PATENT DOCUMENTS

| | | | |
|---|---|---|---|
| 4,032,757 A | | 6/1977 | Eccles |
| 4,438,648 A | * | 3/1984 | Cheney, Jr. ..................... 73/195 |
| 4,870,859 A | * | 10/1989 | Twerdochlib ................... 73/203 |
| 4,885,943 A | * | 12/1989 | Tootell et al. ............... 73/861.77 |
| 5,138,888 A | * | 8/1992 | Walmer, Sr. ............... 73/861.83 |
| 5,206,810 A | | 4/1993 | Bools et al. |
| 2007/0044768 A1 | | 3/2007 | Eick et al. |
| 2009/0194485 A1 | | 8/2009 | Colotte et al. |
| 2012/0272710 A1 | * | 11/2012 | Godel et al. ................... 73/1.16 |

FOREIGN PATENT DOCUMENTS

| | | |
|---|---|---|
| EP | 0 653 690 A1 | 5/1995 |
| EP | 0 761 948 A2 | 3/1997 |
| EP | 1 589 205 A2 | 10/2005 |

OTHER PUBLICATIONS

United Kingdom Search Report issued Oct. 16, 2013 in Patent Application No. GB 1306796.2.
French Preliminary Search Report issued Jan. 15, 2013, in French 12 53615, filed Apr. 19, 2012 (with English Translation of Category of Cited Documents).

* cited by examiner

*Primary Examiner* — Eric S McCall
(74) *Attorney, Agent, or Firm* — Oblon, McClelland, Maier & Neustadt, L.L.P.

(57) ABSTRACT

The principal object of the invention is a method for managing the operation of a metering unit of a turbomachine fuel injection system, characterized in that a channel of the metering unit is selected according to the reliability of the injection system's flowmeter, determined by reliability conditions of the flowmeter providing information as to whether or not there is confidence in the flowmeter.

8 Claims, 3 Drawing Sheets

STATE OF THE ART

STATE OF THE ART

STATE OF THE ART

STATE OF THE ART

STATE OF THE ART

METHOD FOR MANAGING THE OPERATION OF A FUEL METERING UNIT

TECHNICAL FIELD

The present invention relates to the field of turbomachines, and notably systems for injecting fuel into turbomachines, and more particularly to fuel metering units. It thus relates to a method for managing the operation of a metering unit, together with a turbomachine including a metering unit of which the operation is managed by such a method.

The invention applies to all types of land-based or aeronautical turbomachines, and notably to aircraft turbomachines, such as turbojets and turboprop engines.

STATE OF THE PRIOR ART

Figure 1:
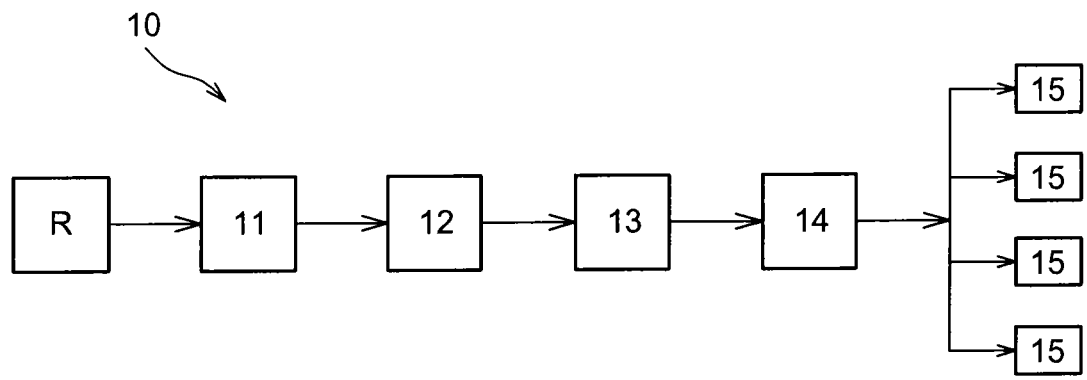

A conventional system for injecting fuel in a turbomachine combustion chamber is illustrated schematically in FIG. 1. System 10 habitually includes, from upstream to downstream according to the fuel's direction of flow in the system, a tank R of fuel, a low-pressure fuel pump 11 receiving fuel from tank R, a high pressure fuel pump 12 connected to the outlet of low-pressure pump 11 by a low-pressure fuel pipe, a metering unit 13 connected to the outlet of high-pressure pump 12 and delivering a fuel flow rate controlled by a flowmeter 14 on a high-pressure fuel pipe supplying multiple injectors 15 of the turbomachine's combustion chamber. Metering unit 13 enables the flow of fuel to the combustion chamber to be regulated, and flowmeter 14 measures the rate of flow of fuel supplying the combustion chamber to enable the pilot to know the quantity of fuel which has been consumed.

The FMU (Fuel Metering Unit) commonly includes an FMV (Fuel Metering Valve) with an opening area which varies according to its position, a constant pressure difference being maintained between the metering valve's inlet and outlet. An ECU (Engine Control Unit) controls the metering unit, in order to adjust the flow of fuel supplied to the engine to a desired value. The excess fuel supplied by the high-pressure pump is recirculated, and returned to the low-pressure fuel pipe.

The position of metering valve is measured by two sensors, notably of the LVDT type (Linear Variable Differential Transformer). Each of the sensors is electrically connected to the ECU, which by this means acquires the position of the metering valve by two different channels.

It is known to find discrepancy anomaly phenomena between these two channels. Indeed, since the position of the metering valve is read by means of two channels, by two different sensors, the values read for each channel may differ relative to one another. If the difference between the read values is greater than a predetermined limiting value, a discrepancy anomaly is declared. If such a discrepancy anomaly occurs it has previously been proposed to establish a method for continuous inspection, enabling the channel of the metering valve to be selected the position of which, converted by application of a dosing function into a theoretical fuel flow rate, gives the closest theoretical value to the value measured by the flowmeter.

However this solution has several disadvantages. In particular, it is not suitable for all the turbomachine's operating regimes, and is not, for example, effective in the event of acceleration and/or deceleration. Indeed, in the event of a discrepancy anomaly between the two channels of the metering valve during acceleration or deceleration, the position of the metering valve changes more rapidly than the flow rate measurement made by the flowmeter. In this manner, a time lag is created which can lead to a poor choice of channel when the known inspection method is applied. In this case the engine control unit records that the flow rate declared by the metering valve is different from the set point, and therefore orders a change of position of the metering valve to return to the set point from the wrong channel. The effect of this is to cause an increase (or reduction) of the flow rate, and thus a change of thrust, which once again leads to a contrary set point.

The consequence of these alternations of set points and these changes from one channel to the other, by application of the known inspection method, is to cause oscillatory phenomena for the fuel flow rate changes, the channels of the metering valve and the N1 (low-pressure compressor) and N2 (high-pressure compressor) operating regimes of a turbomachine.

Figure 2:
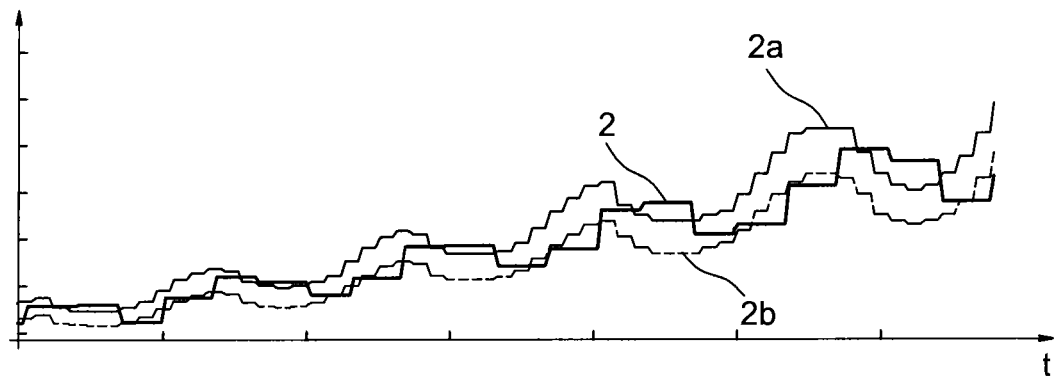
Figure 3:
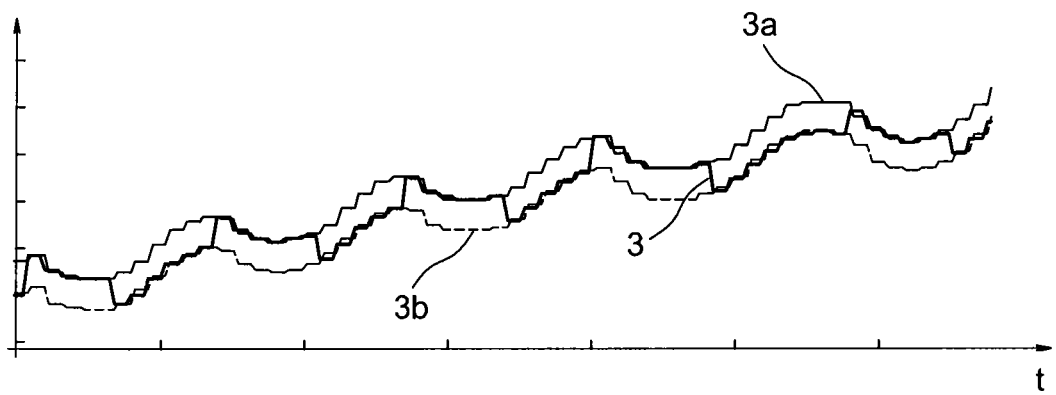
Figure 4:
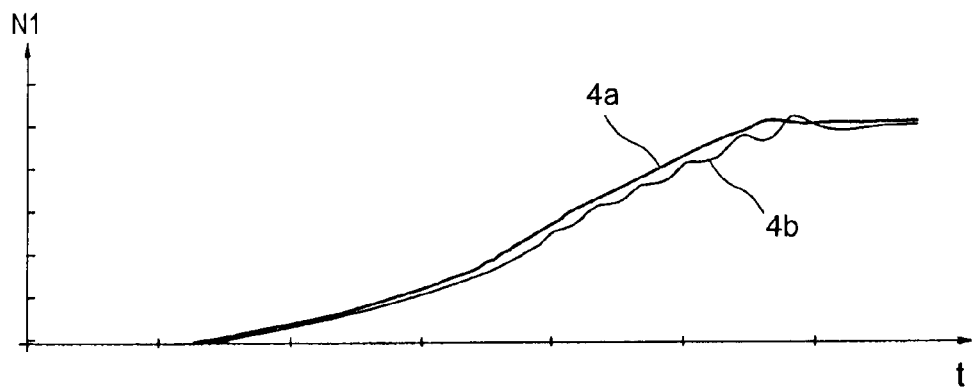
Figure 5:
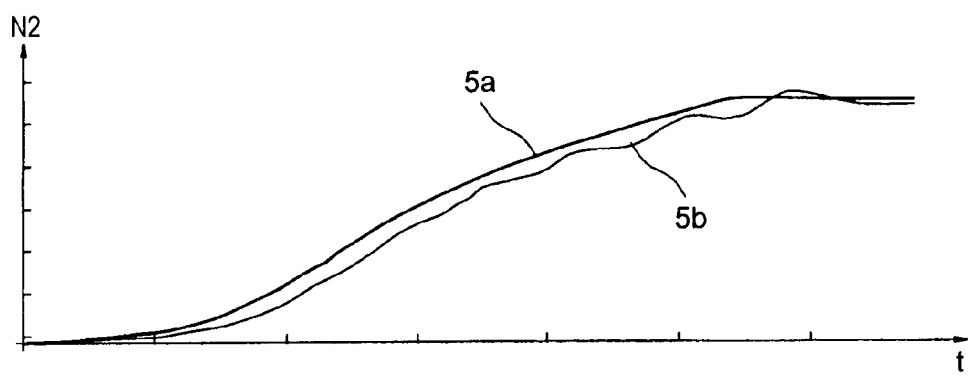

For example, FIG. 2 represents three curves showing the fuel flow rate changes over time. Curve 2 represents the change of the flow rate measured by the flowmeter, and curves 2a and 2b represent respectively the change of the flow rates in channels A and B of the metering valve. In addition, FIG. 3 represents respectively the three curves 3a, 3b and 3 showing the change of channels A and B, and the selected channel, of the metering valve. Finally, FIGS. 4 and 5 represent respectively the curves of the change of the turbomachine's N1 and N2 operating regimes. Curves 4a and 5a are respectively the theoretical changes of the N1 and N2 regimes, while curves 4b and 5b are respectively the changes of the N1 and N2 regimes in the event of a discrepancy anomaly between the channels of the metering unit.

These oscillatory phenomena which occur in the event of a discrepancy anomaly, and which are clearly shown in FIGS. 2 to 5, can be problematic for the satisfactory operation of the turbomachine, and too great to be acceptable.

DESCRIPTION OF THE INVENTION

The aim of the invention is to provide at least partially a solution to the disadvantages mentioned above, compared with the embodiments of the prior art.

The object of the invention is thus, according to one of its aspects, a method for managing the operation of a metering unit of a turbomachine fuel injection system, characterised in that a channel of the metering unit is selected according to the reliability of the injection system's flowmeter, determined by reliability conditions of the flowmeter providing information as to whether or not there is confidence in the flowmeter.

The expression "reliability of the flowmeter" means the flowmeter's capacity to give a correct (or reliable) value of the fuel flow rate which is consistent with the selected channel of the metering unit. In other words, the flowmeter is reliable when the measured flow rate value is roughly equal to the fuel flow rate delivered by the metering unit, and the flowmeter is non-reliable otherwise. The flowmeter's reliability may be dependent on one or more operational limitations of the flowmeter.

By virtue of the invention it may be possible to adapt to the operational limitations of the injection system's flowmeter, for example a substantial time lag between the instantaneous real value of the flow rate and the value given by the flowmeter, by selecting a channel of the metering unit according to the whether or not there is confidence in the flowmeter. In this manner, it may be possible to prevent or to reduce the appearance of the oscillatory phenomena described above, by preventing switching from one channel to the other when the flowmeter's measurement is not reliable. In addition, since one channel of the metering unit is selected taking account of the flowmeter's reliability, or lack of it, the invention enable the engine to be protected by selecting an appropriate channel.

The method according to the invention can also include one or more of the following characteristics, taken in isolation or in all possible technical combinations.

The method is advantageously implemented in the event of a discrepancy anomaly between the channels of the metering unit. The method may then be continued for as long as the discrepancy anomaly is present, and indeed for a predetermined minimum duration, for example 3.5 s, after the disappearance of the discrepancy anomaly.

Operation of the metering unit may be managed by the engine control unit. In particular, the said channel may be selected by means of the engine control unit.

When there is confidence in the flowmeter, the method may include a first step of selection consisting in selecting the channel of the metering unit the position of which, converted by application of a dosing function into a theoretical fuel flow rate, gives the closest theoretical value to the value measured by the flowmeter.

The first step of selection may thus be implemented in repeated fashion for as long as the discrepancy anomaly between the channels of the metering unit is present, and for as long as confidence in the flowmeter is maintained.

When there is a lack of confidence in the flowmeter the method may include a second step of selection consisting in selecting:

(4) the channel last selected the last time there was confidence in the flowmeter, or, (5) if the said last selected channel is not defined:

(6) the channel the position of which, converted by application of a dosing function into a theoretical fuel flow rate, gives the highest theoretical flow rate value within the flowmeter's bounds, i.e. an interval of flow rate values centred on the flow rate value measured by the flowmeter, or, (7) the channel the position of which, converted by application of a dosing function into a theoretical fuel flow rate, gives the highest theoretical flow rate value if neither channel gives a theoretical flow rate value within the flowmeter's bounds.

If the state of lack of confidence in the flowmeter has been preceded by a state of confidence in the flowmeter and if, consequently, the first step of selection has been implemented according to the method of the invention, the channel which was last selected the last time there was confidence in the flowmeter is defined, and thus alternative (4) above is applied to the second step of selection.

Conversely, if a discrepancy anomaly appears for the first time, and if there is a lack of confidence in the flowmeter, and if this state is then consequently not preceded by a state of confidence in the flowmeter, the said last selected channel is not defined, and thus alternative (5) above is applied to the second step of selection. More specifically, the selected channel is then the channel with the highest flow rate which is within the flowmeter's bounds, or the channel with the highest flow rate, if neither channel has a flow rate within the flowmeter's bounds.

The choice of a channel with the highest flow rate when there is a lack of confidence in the flowmeter may enable the turbomachine's engine to be protected. The last transition to a state of confidence in the flowmeter may then enable the most appropriate channel to be selected, and to be kept selected for as long as confidence remains.

The flowmeter's bounds may, for example, be equal to an interval $[D_m - X \cdot D_m; D_m + X \cdot D_m]$ of flow rate values centred on flow rate value $D_m$ measured by the flowmeter, and the lower and upper limits of which are respectively equal to $D_m - X \cdot D_m$ and $D_m + X \cdot D_m$, where X is an adjustment factor, for example equal to 26%.

The second step of selection may be implemented in repeated fashion for as long as the discrepancy anomaly between the channels of the metering unit is present, and for as long as there is a lack of confidence in the flowmeter.

The transition from the state of confidence in the flowmeter to the state of lack of confidence in the flowmeter may thus cause the second step of selection of the method according to the invention to be implemented, instead of the first step of selection. In the same way, transition from the state of lack of confidence in the flowmeter to the state of confidence in the flowmeter may cause the first step of selection to be implemented, instead of the second step of selection.

In other words, the first step of selection is advantageously never implemented when there is a lack of confidence in the flowmeter, and the second step of selection is advantageously never implemented when there is confidence in the flowmeter.

Lack of confidence in the flowmeter may occur when one or more of the following reliability conditions of the flowmeter are met:

(a) the value of the flow rate measured by the flowmeter is less than or equal to a minimum threshold flow rate, notably 700 kg/h (with a hysteresis of 50 kg/h), (b) the position of the metering unit's metering valve has a displacement gradient greater than a maximum threshold gradient, notably 1 mm/s, (c) a change of channel of the metering unit has just occurred, (d) the metering valve has a malfunction, notably a servo-control malfunction, a "wrap" malfunction, i.e. a malfunction of non-return of the transmitted current, or a double malfunction, i.e. a loss of control of the metering valve in both control channels, (e) a minimal duration, notably 3.5 s, has not yet elapsed since the last time when none of reliability conditions (a) to (d) was met.

Confidence in the flowmeter may occur when none of reliability conditions (a) to (e) is met.

The signal enabling the value of the flow rate, used in the method according to the invention, measured by the flowmeter to be obtained, may be processed before being used. The signal may, for example, be subject to specific filtering. Compensation may be made for the square wave pattern created by the flowmeter's mechanics, which may be seen for example in FIG. 2.

Processing of the signals received by the engine control unit, notably the processing for the value of the flow rate measured by the flowmeter, may enable the probability of there being confidence in the flowmeter to be increased.

The method may also include a third step of selection, consisting in selecting the channel closest to the closed position of the metering unit when the turbomachine's engine is stopped. The method may thus enable an appropriate channel to be selected even if the engine is out of service.

Another object of the invention, according to another of its aspects, is a turbomachine characterised in that it includes a metering unit operation of which is managed by the method as defined above.

BRIEF DESCRIPTION OF THE ILLUSTRATIONS

Figure 6:
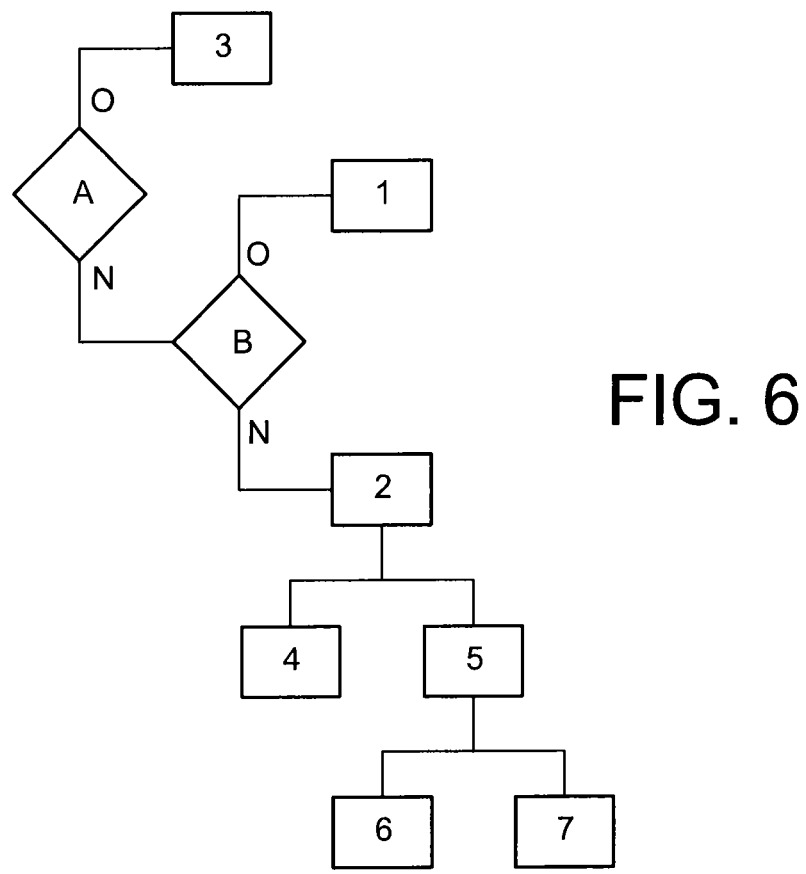

The invention will be able to be better understood on reading the detailed description, below, of a non-restrictive example implementation of it, and also on examining the figures, which are schematic and partial, of the appended illustration, in which:

FIG. 1 illustrates a conventional system for injecting fuel in a turbomachine combustion chamber, FIG. 2 is a graph representing the change of fuel flow rates over time, FIG. 3 is a graph representing the change of channels of the metering valve over time, FIG. 4 is a graph representing the change of regime N1 of the turbomachine over time, FIG. 5 is a graph representing the change of regime N2 of the turbomachine over time, and FIG. 6 is a diagram illustrating the method according to the invention.

In all these figures, identical references can designate identical or comparable elements.

DETAILED ACCOUNT OF A PARTICULAR EMBODIMENT

With reference to FIG. 6, a diagram illustrating the method according to the invention has been represented.

In the course of step A an examination is made as to whether or not the turbomachine's engine is stopped.

If the engine is stopped (case O), third step 3 of selection consists in selecting the channel closest to the closed position of the metering unit.

In the contrary case, i.e. the engine is in operation (case N), a channel of the metering unit is selected according to the reliability of the injection system's flowmeter, this reliability being determined by the flowmeter's reliability conditions providing information as to whether or not there is confidence in the flowmeter.

In the course of step B, the flowmeter's the reliability conditions are thus examined. In particular, as explained above, it is considered that a state of lack of confidence in the flowmeter occurs when one or more of the flowmeter's reliability conditions below are met:

(a) the value of the flow rate measured by the flowmeter is less than or equal to a minimum threshold flow rate equal to 700 kg/h, (b) the position of the metering unit's metering valve has a displacement gradient greater than a maximum threshold gradient of 1 mm/s, (c) a change of channel of the metering unit has just occurred, (d) the metering valve has a malfunction, (e) a minimal duration of 3.5 s has not yet elapsed since the last time when none of the reliability conditions (a) to (d) was met.

Examination of the flowmeter's different reliability conditions in the course of step B enables it to be determined whether there is confidence in the flowmeter (case O), or a lack of confidence in the flowmeter (case N).

When there is confidence in the flowmeter, the method includes a first step 1 of selection which consists in selecting the channel of the metering unit the position of which, converted by application of a dosing function into a theoretical fuel flow rate, gives the closest theoretical value to the value measured by the flowmeter.

First step of selection 1 is then implemented in repeated fashion for as long as a discrepancy anomaly between the channels of the metering unit is present, and for as long as confidence in the flowmeter is maintained.

Conversely, when there is a lack of confidence in the flowmeter, the method includes a second step 2 of selection which consists either in selecting the last channel selected the last time there was confidence in the flowmeter (step 4) or, if the last selected channel is not defined (step 5), in selecting a channel according to steps 6 or 7.

In particular, if a discrepancy anomaly between the channels of the metering unit has previously occurred, and if there is already confidence in the flowmeter, a channel exists which was last selected when there was confidence in the flowmeter, and it is this channel which is chosen (step 4) in the course of second step 2 of selection.

Conversely, if the said last selected channel is not defined (step 5), for example because this is the first appearance of a discrepancy anomaly, selection of the channel will depend on the conditions of steps 6 and 7.

Specifically, step 6 enables the channel to be selected of which the position, converted by application of a dosing function into a theoretical fuel flow rate, gives the highest theoretical flow rate value if this value is within the flowmeter's bounds, i.e. an interval of flow rate values centred on the flow rate value measured by the flowmeter.

Step 7, for its part, enables the channel to be selected of which the position, converted by application of a dosing function into a theoretical fuel flow rate, gives the highest theoretical flow rate value if neither of the channels gives a theoretical flow rate value which is within the flowmeter's bounds.

After the channel has been selected in the course of step 2, this second step 2 of selection continues to be implemented in repeated fashion for as long as a discrepancy anomaly between the metering unit exists, and for as long as there is a lack of confidence in the flowmeter.

The method according to the invention thus enables the channel of the metering unit to be selected in the event of a discrepancy anomaly between the channels, according to the reliability, or confidence, of the flowmeter.

In this way, the engine may be protected by preventing an inappropriate channel from being chosen.

Similarly, it is also possible for the oscillatory phenomena resulting from the application of prior methods for managing the operation of a metering unit to be limited or prevented.

The invention is, naturally, not limited to the example embodiment which has just been described. Various modifications may be made to it by those skilled in the art.

The expression "including a" must be understood as being synonymous with "including at least one", unless the contrary is specified.

The invention claimed is:

1. A method for managing the operation of a metering unit of a fuel injection system of a turbomachine, comprising:
   determining reliability conditions of a flowmeter of the fuel injection system to determine whether or not there is currently confidence in the flowmeter;
   selecting a channel of the metering unit which provides a closest theoretical value to a value measured by the flowmeter if there is currently confidence in the flowmeter;
   selecting a last channel that was previously selected a last time there was confidence in the flowmeter, if there is currently a lack of confidence in the flowmeter and there was previously confidence in the flowmeter;
   calculating a theoretical fuel flow rate of each channel by based on a position of the channel and a dosing function;
   determining if the theoretical fuel flow rate of each channel is within an interval of flow rate values centered on a flow rate value measured by the flowmeter;
   selecting a channel having a position which presents a highest theoretical fuel flow rate value within the interval of flow rate values centered on the flow rate value measured by the flowmeter, if there is currently a lack of confidence in the flowmeter and there was previously a lack of confidence in the flowmeter and at least one of the theoretical fuel flow rates is within the interval of flow rate values centered on the flow rate value measured by the flowmeter; and selecting a channel having a position which presents the highest theoretical flow rate value, if there is currently a lack of confidence in the flowmeter and there was previously a lack of confidence in the flowmeter and none of the theoretical fuel flow rates are within the interval of flow rate values centered on the flow rate value measured by the flowmeter.

2. A method according to claim 1, wherein the method is implemented in the event of a discrepancy anomaly between the channels of the metering unit.

3. A method according to claim 1, wherein the selecting the channel of the metering unit which provides a closest theoretical value to a value measured by the flowmeter is repeated for as long as a discrepancy anomaly between the channels of the metering unit is present, and for as long as confidence in the flowmeter is maintained.

4. A method according to claim 1, wherein the selecting the last channel or selecting the channel presenting the highest theoretical fuel flow rate value is repeated for as long as a discrepancy anomaly between the channels of the metering unit is present, and for as long as lack of confidence in the flowmeter is maintained.

5. A method according to claim 1, further comprising selecting a channel closest to a closed position of the metering unit when the turbomachine is stopped.

6. A turbomachine including a metering unit the operation of which is managed by the method according to claim 1.

7. A method according to claim 1, wherein there is a lack of confidence in the flowmeter occurs when one or more of the following reliability conditions of the flowmeter are met:
  (a) the value of the flow rate measured by the flowmeter is less than or equal to a minimum threshold flow rate,
  (b) the position of the metering unit's metering valve has a displacement gradient greater than a maximum threshold gradient,
  (c) a change of channel of the metering unit has just occurred,
  (d) the metering valve has a malfunction,
  (e) a minimal duration has not yet elapsed since the last time when none of reliability conditions (a) to (d) was met.

8. A method according to claim 7, wherein there is confidence in the flowmeter occurs when none of reliability conditions (a) to (e) is met.

* * * * *